United States Patent
Stephan et al.

(10) Patent No.: US 6,966,681 B2
(45) Date of Patent: *Nov. 22, 2005

(54) ACTIVE NIGHT VISION SYSTEM FOR VEHICLES EMPLOYING ANTI-BLINDING SCHEME

(75) Inventors: Craig H. Stephan, Ann Arbor, MI (US); Jeffrey T. Remillard, Ypsilanti, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/605,815

(22) Filed: Oct. 29, 2003

(65) Prior Publication Data

US 2005/0094410 A1  May 5, 2005

(51) Int. Cl.$^7$ ............................................. H01J 40/14
(52) U.S. Cl. ...................... 362/464; 362/230; 362/510; 250/214 VT; 250/214 R
(58) Field of Search ................................ 362/231, 464, 362/510, 543, 230; 250/330, 214 VT, 341.8, 250/214 R; 313/523

(56) References Cited

U.S. PATENT DOCUMENTS

| | | | |
|---|---|---|---|
| 5,760,887 A * | 6/1998 | Fink et al. | 356/5.03 |
| 6,193,393 B1 * | 2/2001 | Dove et al. | 362/251 |
| 6,400,099 B1 * | 6/2002 | Walker | 315/291 |
| 6,576,884 B1 * | 6/2003 | Ostromek et al. | 250/214 VT |
| 6,774,367 B2 * | 8/2004 | Stephan et al. | 250/330 |
| 6,828,544 B2 * | 12/2004 | Stephan et al. | 250/214 VT |

* cited by examiner

*Primary Examiner*—Thomas M. Sember
(74) *Attorney, Agent, or Firm*—Frank A. MacKenzie

(57) ABSTRACT

A night vision system for a vehicle includes a pulsed light source for illuminating a region proximate the vehicle and a secondary trigger light source operating at a predetermined pulse timing and second wavelength. A light sensor detects light at the second wavelength. The trigger light pulses are used to indicate the pulse timing of each respective vehicle's primary NIR light source. Upon detecting another vehicle's trigger light source, the controller adjusts the pulse phase of the first light source to be exactly out-of-phase with that of the oncoming vehicle since the pulsed timing of the oncoming vehicle's NIR light source is known upon detection of the opposing vehicle's trigger light source. Each vehicle can then adjust its primary light source to be out-of-phase with the other vehicle and, hence, non-interfering.

20 Claims, 12 Drawing Sheets

ACTIVE NIGHT VISION SYSTEM FOR VEHICLES EMPLOYING ANTI-BLINDING SCHEME

BACKGROUND OF INVENTION

The present invention relates to a night vision system for detecting objects at relatively low visible light levels. In particular, the invention concerns an active night vision system having an anti-blinding scheme employing pulsed illumination and synchronization with detected pulsed light sources from oncoming vehicles.

Night vision systems are utilized to allow a user to see objects at relatively low visibility light levels. Night vision systems typically are classified as either passive night vision systems or active night vision systems. In known passive night vision systems used in automotive applications, mid-infrared cameras are used to image objects using the ambient infrared light emitted by the objects in the environment. Mid-infrared night vision systems have relatively few pixels and, accordingly, images formed using such cameras have low video resolution and a relatively narrow field of view. Known active night vision systems utilize a near-infrared (NIR) laser diode or a filtered incandescent light source to generate NIR light. The NIR light is subsequently reflected off objects in the environment and is received by a NIR-sensitive camera. The camera generates a video signal responsive to received light.

An improved active night vision system is disclosed in U.S. patent application Ser. No. 09/598,484 entitled "A Night Vision System Utilizing A Diode Laser Illumination Module And A Method Related Thereto," which is herein incorporated by reference. That application describes an active night vision system that uses a NIR diode laser to illuminate the region forward of the vehicle, and a CCD camera to process and display images within the illuminated region. Because NIR light is invisible to the human eye, the laser light can be formed into a high beam pattern to illuminate potential hazards without blinding oncoming vehicle operators. Such systems, however, are susceptible to blinding by oncoming vehicles similarly equipped with a night vision NIR light source.

One solution to night vision system blinding by oncoming vehicles similarly equipped with a NIR light source is provided in U.S. patent application Ser. No. 09/683,840 entitled "GPS-Based Anti-Blinding System For Active Night Vision." In that application, GPS is used to determine the direction of travel of the vehicles as well as an absolute time reference. Vehicles proximate one another synchronize their pulsed light sources to the absolute time reference signal with the phase of the light pulse based on the direction of motion of the respective vehicles. In this way, two cars approaching one another from opposite directions will have their NIR light sources pulsed out-of-phase with each other at duty cycles below 50% to avoid having their light source "on" when the opposing vehicle's camera is also "on." The disclosed anti-blinding scheme, however, requires that all night vision equipped vehicles must also be equipped with GPS systems.

Thus, there exists a need for alternate night vision systems and methods related thereto that mitigate or eliminate blinding of the vehicle's night vision system by similarly equipped approaching vehicles.

SUMMARY OF INVENTION

The present invention provides an active night vision system and method related thereto which mitigates the blinding effects of nearby similarly equipped vehicles. The anti-blinding scheme of the present invention synchronizes the pulsed light sources of respective vehicles approaching each other from opposite directions to be out-of-phase without the use of GPS or any other external reference source. A night vision system in accordance with one embodiment of the present invention includes an illuminating device such as a NIR light source and beam-forming optics for illuminating a region in the forward direction of travel of the vehicle. A receiver, such as a camera, receives light reflected off objects in the illuminated region and generates a video signal responsive to the received light. A second light source is provided which acts as a timing trigger pulse operating at a wavelength different than the NIR light source. The light sensor is configured to detect light at a wavelength corresponding to the second light source and generate a timing signal in response thereto. The pulse timing of the second light source is known with respect to the first light source. Upon detecting another vehicle's trigger light source, the controller adjusts the pulse phase of the first light source to be exactly out-of-phase with that of the oncoming vehicle since the pulsed timing of the oncoming vehicle's NIR light source is known upon detection of the opposing vehicle's trigger light source. In this way, the trigger light pulses are used to indicate the pulse timing of each respective vehicle's primary NIR light source. By knowing the other vehicle's light source timing sequence, the reference vehicle's light source timing sequence can be adjusted accordingly to be out-of-phase and thus, non-interfering.

In another embodiment, a rearward trigger pulse is also emitted which differs from the forward trigger pulse or primary NIR pulse. The rearward trigger pulse is used to synchronize all vehicles traveling in the same direction in-phase, such that none are "visible" to the oncoming night-vision-equipped vehicles.

Other advantages and features of the invention will become apparent to one of skill in the art upon reading the following detailed description with reference to the drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

Figure 1:
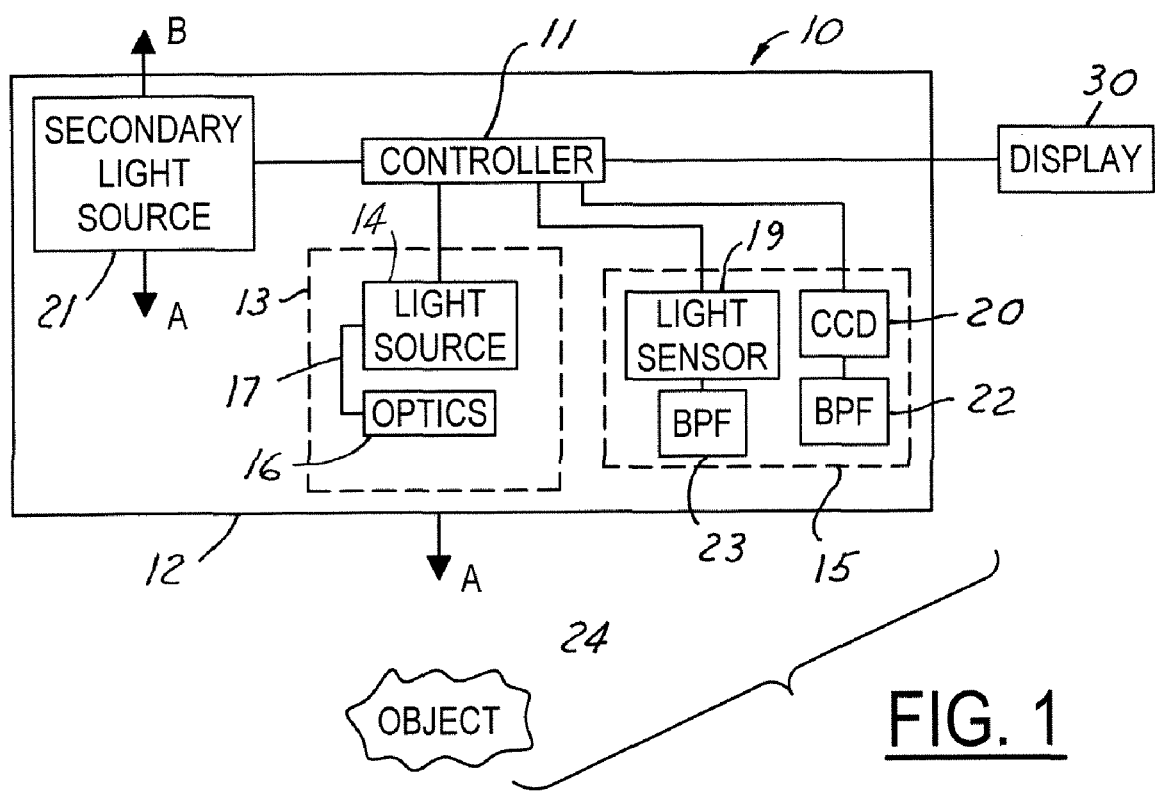
FIG. 1 is a schematic block diagram of a night vision system in accordance with one embodiment of the present invention.

Referring now to the drawings wherein like reference numerals are used to identify identical components in the various views, FIG. 1 illustrates a night vision system 10 for detecting objects at relatively low visibility light levels. The system 10 may be utilized in a plurality of applications. For example, the system 10 may be used in an automotive vehicle to allow a driver to see objects at night that would not otherwise visible to the naked eye. As illustrated, the system 10 includes a controller 11, an illumination subsystem 13, a receiver 15 and, a secondary light source 21.

Several of the system components may be included within a housing 12. It should be understood, however, that the components of system 10 contained within housing 12 could be disposed at different locations within the vehicle wherein the housing 12 may not be needed. For example, the components of the system 10 could be disposed at different operative locations in the automotive vehicle such that a single housing 12 would be unnecessary. Housing 12 is provided to enclose and protect the various components of the system 10. Housing 12 may be constructed from a plurality of materials including metals and plastics.

As will be discussed in more detail below, the system 10 may be used to detect any reflective object, such as object 24, in operative proximity to the system 10.

The controller 11 is preferably a microprocessor-based controller including drive electronics for the illumination subsystem 13, receiver 15, and image processing logic for the display system 30. Controller 11 also includes drive electronics for the secondary light source 21. Alternatively, display unit 30 may include its own respective control logic for generating and rendering image data.

The illumination subsystem 13 includes a NIR light source 14, beam-forming optics 16, and a coupler 17 between the two. Many light source and optics arrangements are contemplated by the present invention. For example, the light source 14 may be a NIR diode laser, the beam forming optics 16 may comprise a thin-sheet optical element followed by a holographic diffuser, whose combined purpose is to form a beam pattern in the direction of arrow A comparable to the high-beam pattern used for normal vehicle headlamps; and the coupler 17 between the light source 14 and optics 16 can be a fiber-optic cable.

The illumination subsystem 13 illuminates the driving environment without visually impairing drivers in approaching vehicles, since the NIR light is not visible to the human eye. The light source 14 may comprise a NIR diode laser or light-emitting diode, or any other NIR source that can be switched on and off at frequencies at or exceeding typical video frame rates (30–60 Hz). For example, the light source 14 may include a single stripe diode laser, model number S-81-3000-C-200-H manufactured by Coherent, Inc. of Santa Clara, Calif. Further, the coupler may be a fiber-optic cable, or the light source could be directly coupled to the optical element 16 through a rigid connector, in which case the coupler would be a simple lens or reflective component. The coupler 17, depending upon the spread characteristics of the light source 14 may be omitted altogether.

Although the system 10 preferably uses a NIR laser light source, an alternate embodiment of system 10 may utilize a conventional light emitting diode NIR source, or any other type of NIR light source, as long as it is capable of pulsed operation, in lieu of the infrared diode laser.

The secondary light source 21 is used as a trigger pulse light source. Secondary light source can comprise any type of pulsed light source but preferably is an infrared light source operating at a different wavelength than primary light source 14. The secondary light source 21 can be used to synchronize the gating of the primary light source and receiver 15 to eliminate the blinding effects which are possible when two similarly equipped vehicles approach one another from opposite directions. The secondary light source 21 is also configured to emit light in the same direction as the illumination subsystem 13, which is indicated by direction arrow A corresponding to the forward direction of travel of the vehicle. The secondary light source can also be configured to transmit light in the direction of indicator arrow B corresponding to the direction rearward of the vehicle. The rearwardly directed trigger pulse is used to synchronize the night vision illumination systems of commonly-equipped vehicles traveling in the same direction as described in further detail below. If the same light source cannot be physically configured to emit light at the second wavelength in both direction A and direction B, two separate light sources may be necessary and are contemplated by the present invention. In such a case, the additional light source would be a tertiary light source similar to the secondary light source. To distinguish light emitted by the secondary light source 21 in direction A, from light emitted in direction B, the secondary light source is capable of transmitting pulses of different duration. The pulse width can then be used by other vehicles to determine whether the light detected from another vehicle's secondary light source came from the front of the other vehicle or rear of the other vehicle. Of course, characteristics other than, or in addition to pulse width can distinguish a forward trigger pulse ($T_F$) from a rearward trigger pulse ($T_R$). For example, the wavelength of light may differ.

More than one rearward trigger pulse ($T_{R1}$, $T_{R2}$) may be necessary to convey synchronization information to vehicles following a reference vehicle. Thus, the secondary (or tertiary) light source includes the capability to further distinguish the normal rearward trigger pulse ($T_{R1}$) from synchronized rearward trigger pulse ($T_{R2}$). Again, this characteristic may be a different pulse width and/or wavelength of light (third wavelength of light). Another distinguishing characteristic may include a double pulse.

The receiver 15 includes a NIR-sensitive camera 20 and optical band pass filter 22. The NIR-sensitive camera 20 provides a video signal responsive to reflected infrared light received by the camera 20. The camera 20 may comprise a CCD camera or a CMOS camera. In one embodiment of the system 10, the CCD camera is camera model number STC-H720 manufactured by Sentech Sensor Technologies America, Inc. Infrared light emitted from the illumination subsystem 13 and reflected off the object 24 in the environment is received by the NIR-sensitive camera 20. The video signal is transmitted to the controller 11 or directly to the display module 30 where it is processed and displayed to allow the vehicle operator to see the object 24. The display 30 may be a television monitor, a CRT, LCD, or the like, or a heads-up-display positioned within the automotive vehicle to allow the user to see objects illuminated by the system 10.

The optical band pass filter 22 is provided to filter the infrared light reflected from the object 24. In particular, the filter 22 only allows light within the NIR light spectrum to be received by the camera 20. Preferably, the filter 22 allows a maximum transmission of light at a wavelength equal to the wavelength of light generated by the NIR light source 14. An advantage of using the filter 22 is that the filter 22 prevents saturation of the pixel elements (i.e., blooming) in the camera 20 by visible light emitted from the headlamps of other automotive vehicles. The filter 22 is preferably disposed proximate to a receiving lens in the camera 20.

The light sensor 19 includes a photodiode or photocell or similar light sensor mounted in the receiver module 15 that is filtered, such as by band pass filter 23, to be sensitive only to light at the wavelength corresponding to the secondary light source 21. Alternatively, the average output signal of the camera 20, spatially integrated over some or all of its field-of-view, could serve as the light sensor 19. Thus, the light sensor 19 detects only trigger pulses ($T_F$, $T_{R1}$, $T_{R2}$) rather than the primary light source.

Figure 2:
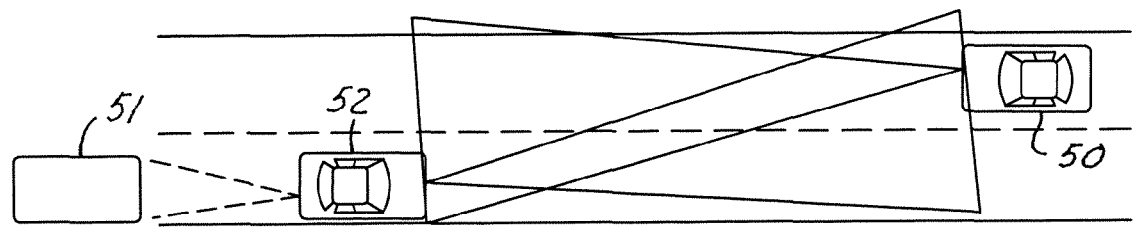
FIG. 2 is a schematic diagram of a vehicle-operating environment in which the present invention may be used to advantage.

Referring now to FIG. 2 there is shown a vehicle-operating environment wherein the present invention may be used to advantage. In FIG. 2, two vehicles 50, 52 are shown approaching one another from opposite directions. Both vehicles 50, 52 are similarly equipped with a night vision system 10 in accordance with the present invention. Vehicle 51, which is following vehicle 52, is also similarly equipped with a night vision system in accordance with the present invention. In such a case, vehicle 52 includes the secondary light source 21 (or tertiary light source) emitting in the rearward direction B such that vehicle 51 can synchronize the pulse timing of its primary light source with that of vehicle 52 so that both vehicles will operate their night vision system in sync with each other, but out-of-phase with approaching vehicle 50. If the illumination sources of vehicles 50 and 52 were simultaneously on, the respective receivers of both vehicles 50, 52 would be saturated or "blinded" by the opposing vehicle's illumination device. In the present invention, this is avoided by gating the illumination device and receiver on and off as a function of a timing signal determined from light sensor 19 in combination with the trigger pulse of secondary light source 21.

Figure 3:
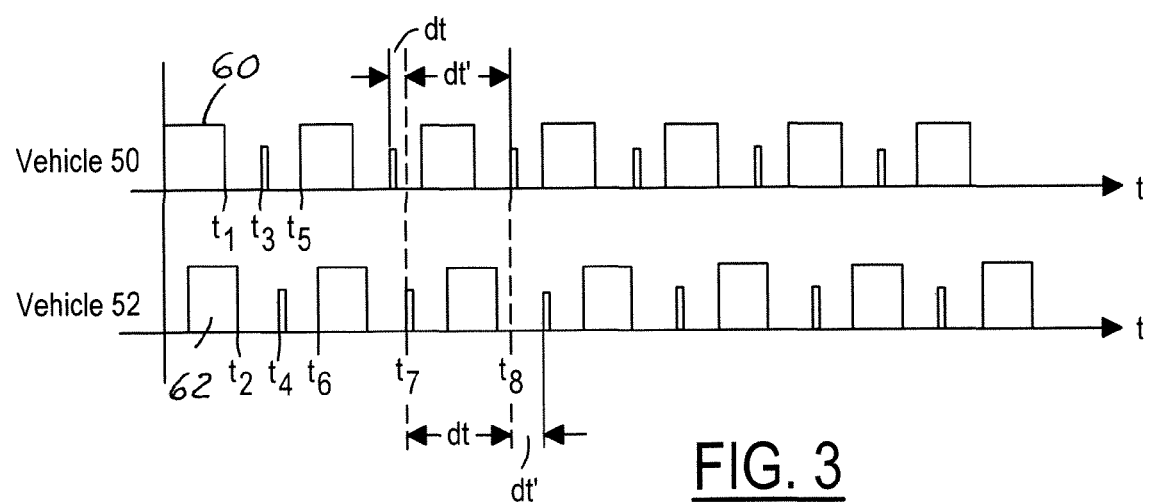
FIG. 3 is a graph showing the timing of the night vision signals for the vehicles of FIG. 2 in accordance with one embodiment of the present invention.

Referring now to FIG. 3, there is shown a timing graph illustrating the night vision signals for the vehicles 50, 52 of FIG. 2 in accordance with a first embodiment of the present invention. The upper portion of FIG. 3 illustrates the pulse sequence for the primary light source of vehicle 50 (FIG. 2) used in the active night vision system. The primary light source pulses are indicated as reference numeral 60. The pulsed light source is being operated at a duty cycle of less than 50%. Similarly, the receiver 15 and, in particular, the camera 20 operates only during that portion of the cycle when the primary light source is on. Similarly, the pulsed light source of approaching vehicle 52 (FIG. 2) is illustrated in the lower portion of FIG. 3 wherein the primary light source pulses are indicated by reference numeral 62. Vehicle 52 also is operating its primary light source at a duty cycle below 50%. The primary light sources, however, need only be operated at a duty cycle of less than 50% upon the detection of another vehicle's trigger pulse. At all other times, they can be operated either in pulse mode or continuously. If the two approaching vehicles are able to coordinate their respective light pulses such that they are out-of-phase with each other, then night vision system blinding is avoided. As described herein, the light sensor 19 is used to ensure that the opposing night vision systems are synchronized out-of-phase with each other.

The pulse repetition rate of the primary light source and trigger pulses of all night-vision-equipped vehicles is the same. The trigger pulses are preferably timed such that they begin exactly at the center of the inter-pulse ("dark") window between primary light source pulses. Thus, referring to FIG. 3, between times $t_1$ and $t_5$, the trigger pulse of vehicle 50 occurs at time $t_3$ which is halfway between $t_1$ and $t_5$. Also, between times $t_2$ and $t_6$, the trigger pulse of vehicle 52 occurs at time $t_4$ which is halfway between $t_2$ and $t_6$. The light sensor is activated during this "dark" interval to detect trigger pulses and generate a respective trigger pulse detection signal.

The system operation will be described with reference to FIG. 3. Upon approaching the other night-vision-equipped vehicle traveling in the opposite direction, each vehicle will detect the other vehicle's front trigger pulse ($T_F$) from the secondary light source which will be in an arbitrary phase relationship to the reference vehicle's night vision system. If the vehicle 50 and vehicle 52 pulse times were exactly out-of-phase with each other, then the vehicle 50 trigger pulses would be centered between the trigger pulses of vehicle 50 and vice versa. In general, though, vehicle 50 will observe a trigger pulse from vehicle 52 at a first differential time (dt) after one of its trigger pulses and a second differential time (dt') before its next pulse, where dt+dt'=T, the pulse period, and vice versa. In the example shown, the light sensor of vehicle 50 first detects a trigger pulse of vehicle 52 beginning at time $t_7$. The controller of vehicle 50 notes that, in this example, dt<dt'. As a result, it advances the phase of its pulse train by a fixed time increment, so that the next trigger pulse and main light pulse occur earlier than they otherwise would. The result is to increase the first time differential (dt) and decrease the second time differential (dt'). When vehicle 50 detects the next trigger pulse from vehicle 52, it again checks the magnitudes of dt and dt' and advances its phase by another time increment as necessary. At some time $t_8$, vehicle 52 detects a trigger pulse from vehicle 50. Since vehicle 52 determines that dt>dt', vehicle 52 retards or delays the phase of its pulse train. Each vehicle continues advancing and delaying its pulse trains until each observes approximately equal intervals for dt and dt', at which point their pulse trains are out-of-phase with respect to one another, as desired.

Rather than advancing or delaying its pulse train by a fixed amount during each pulse period, the controller could alter the interval depending upon the ratio dt/dt'.

Figure 4A:
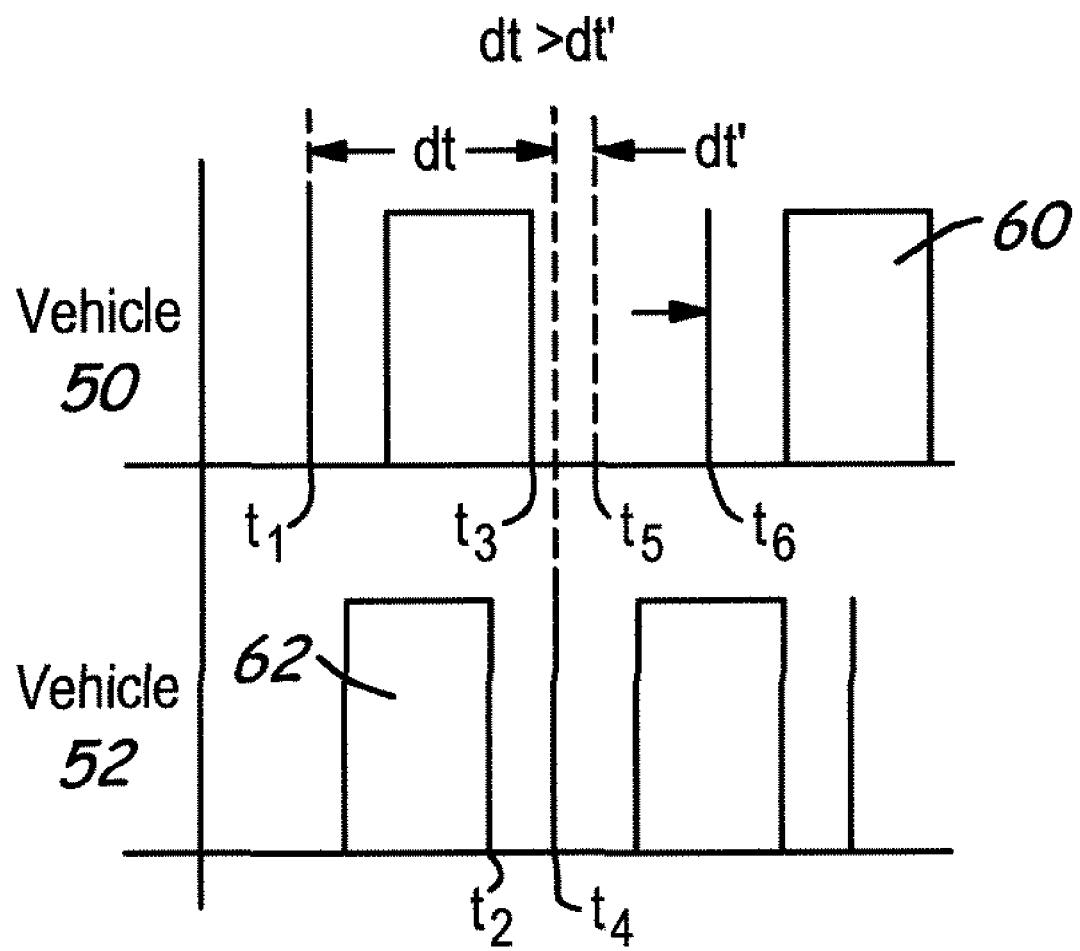
FIGS. 4A and 4B are graphic illustrations of the timing of the night vision signals for the vehicles of FIG. 2 in accordance with another embodiment of the present invention.
Figure 4B:
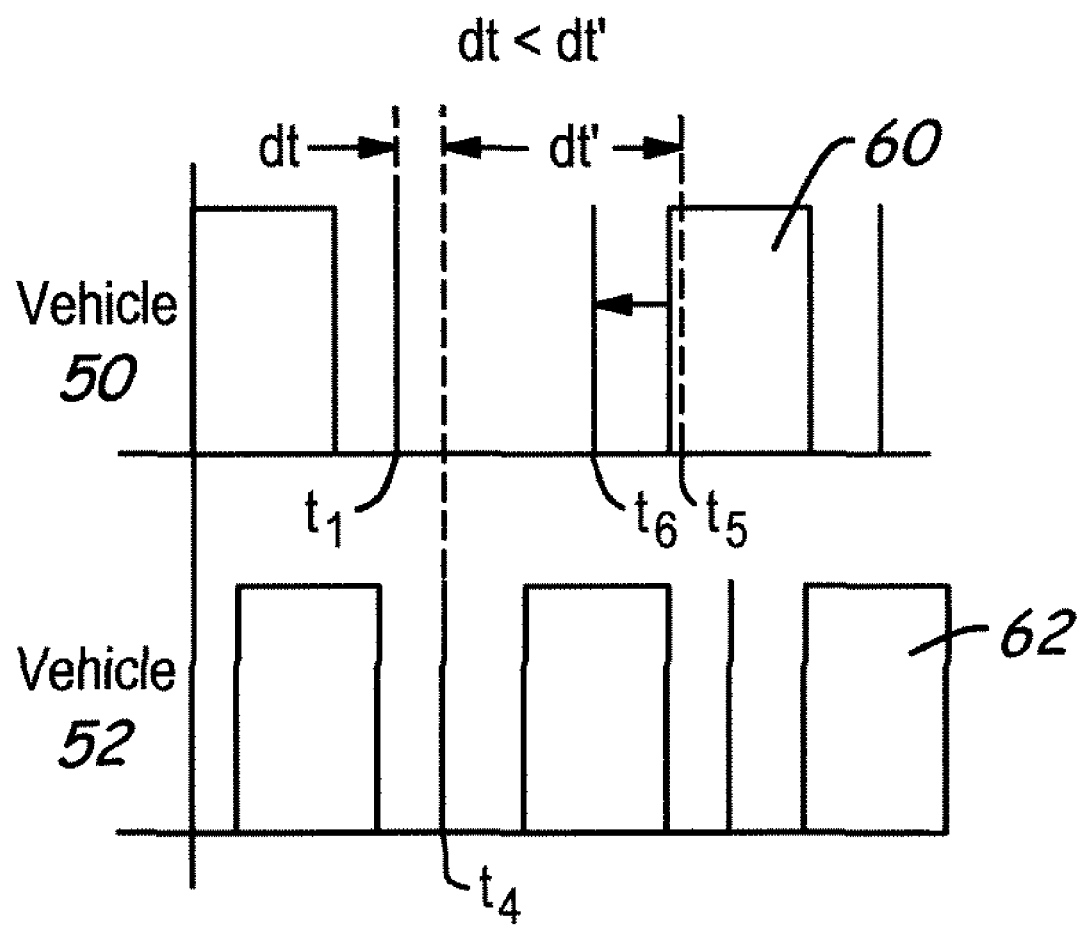

The foregoing synchronizing scheme is very robust. A simplified scheme is also contemplated. Because the pulse repetition rate (the period T) of the primary light source and trigger pulses of all similarly-equipped NVE vehicles is the same, the pulse trains can be synchronized out of phase immediately upon the detection of a trigger pulse. For example, when vehicle 50 detects the trigger pulse of vehicle 52 at time $t_4$, the controller of vehicle 50 can determine that the center of the primary light source pulse 62 of vehicle 52 will occur at T/2 after $t_4$. FIGS. 4A and 4B illustrate the cases where the trigger pulse is detected by vehicle 50 during the interval between its primary light pulses. If dt>dt' the vehicle 50 delays its trigger pulse by the required amount (FIG. 4A); if dt<dt' vehicle 50 advances its trigger pulse by the required amount (FIG. 4B). In the latter case, vehicle 50 delays its next primary light pulse until after the phase adjusted trigger pulse has been sent. Thus, in FIGS. 4A and 4B, the next trigger pulse for vehicle 50 would normally occur at time $t_5$. In cases where dt>dt', the next trigger pulse is delayed until time $t_6$ (FIG. 4A) or advanced to time $t_6$ (FIG. 4B), and the next primary light pulse to be centered at a time T/2 after time $t_6$.

Figure 5A:
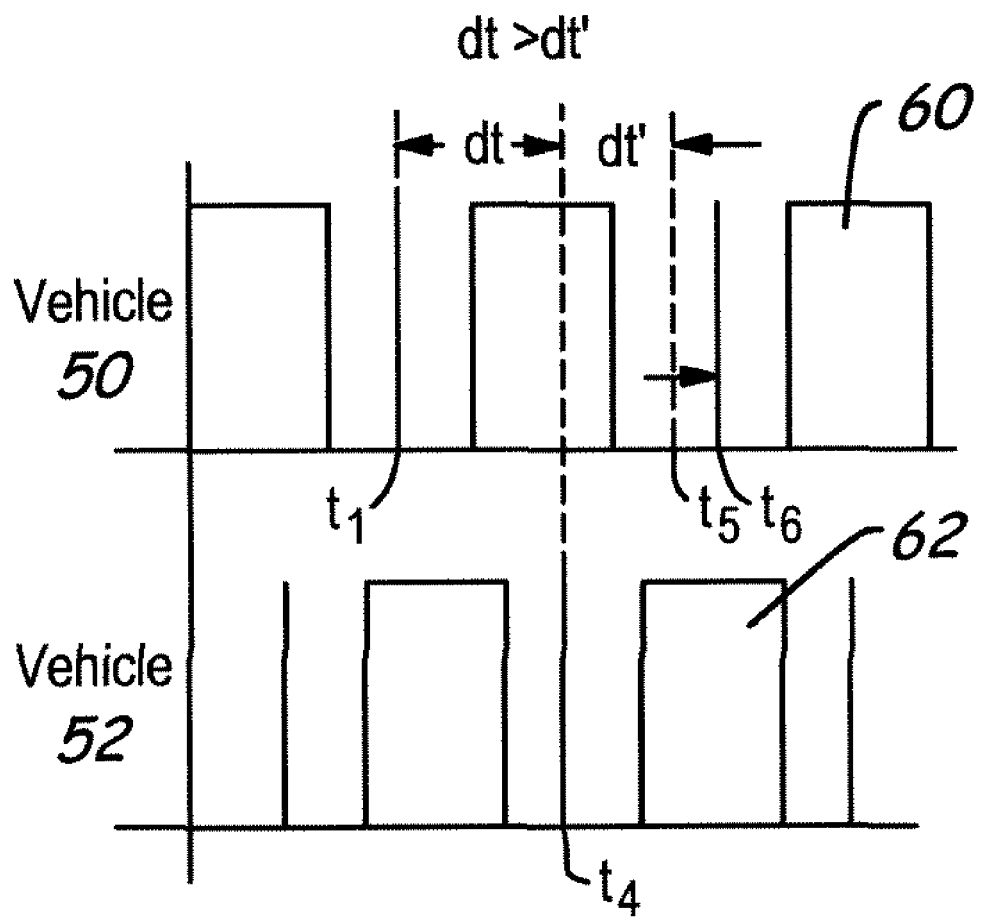
FIGS. 5A and 5B are graphic illustrations of the timing of the night vision signals for the vehicles of FIG. 2 in accordance with another embodiment of the present invention.
Figure 5B:
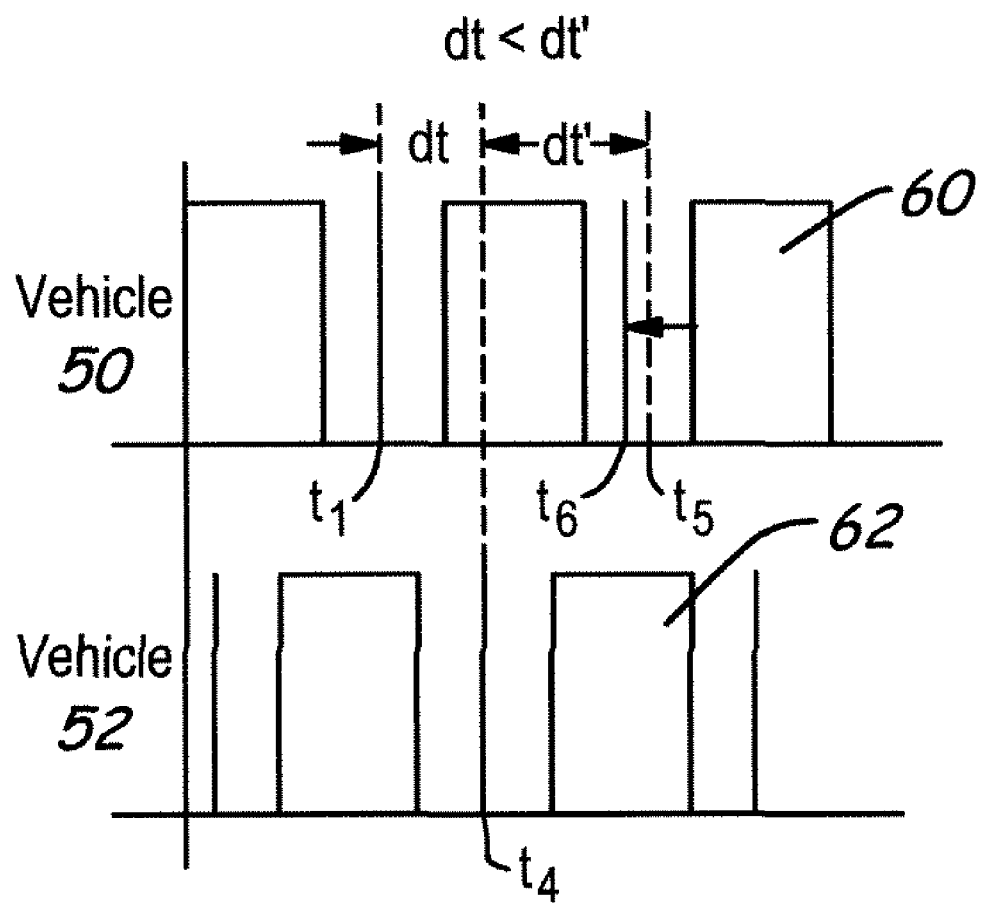

FIGS. 5A and 5B illustrate the cases where the trigger pulse is detected by vehicle 50 during an interval when its primary light pulse is on. As before it delays (dt>dt') or advances (dt<dt') its next trigger pulse to occur at a time interval T/2 after $t_4$. In the case where dt<dt', vehicle 50 may optionally choose to cut short its primary light pulse so as not to overlap with the primary light pulse from vehicle 52. This simplified scheme is advantageous in that the respective vehicle NVE systems are immediately synchronized out of phase within a single time period T. In this scheme, the vehicles 50, 52 would be operating their primary light sources in a pulsed mode with a duty cycle less than 50%. If operated in continuous mode, upon detection of an oncoming trigger pulse, each vehicle would immediately operate their primary light sources in a pulsed mode.

In principle, two cars could approach each other with their light pulses exactly in phase and each first detect the other's trigger pulse at exactly the same instant. If this were to occur, each vehicle would simultaneously switch its phase by half a time period, with the result that both vehicles' pulses would remain in phase. This occurrence would be extremely unlikely, and slight differences in timing would probably result in resolving the problem after a few time periods. Nevertheless, if it were desired to prevent even the possibility of such a situation occurring, the following procedure could be used. If a vehicle detected an oncoming vehicle's trigger pulse at the same time it was sending out its own trigger pulse, it could delay its next trigger pulse by a fraction of the time period T, that fraction being determined by generating a random number based on a unique seed value. For example, the seed could be a system clock, the vehicle's current speed, an encoded vehicle identification number (VIN), or any such easily-accessed number. Thus in the following time period the two vehicles' light pulses would be out of phase by a random amount and could then be set exactly out of phase as before.

Figure 6:
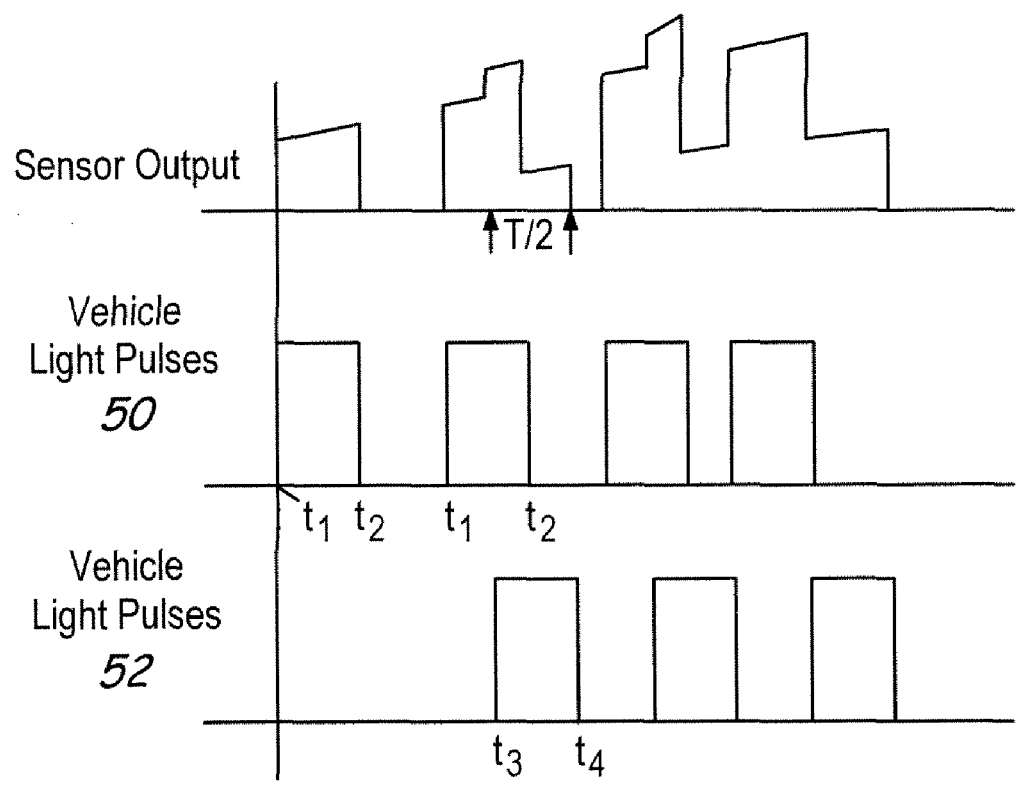
FIG. 6 shows the sensor output for one method of operating the night vision system according to the present invention.
Figure 7:
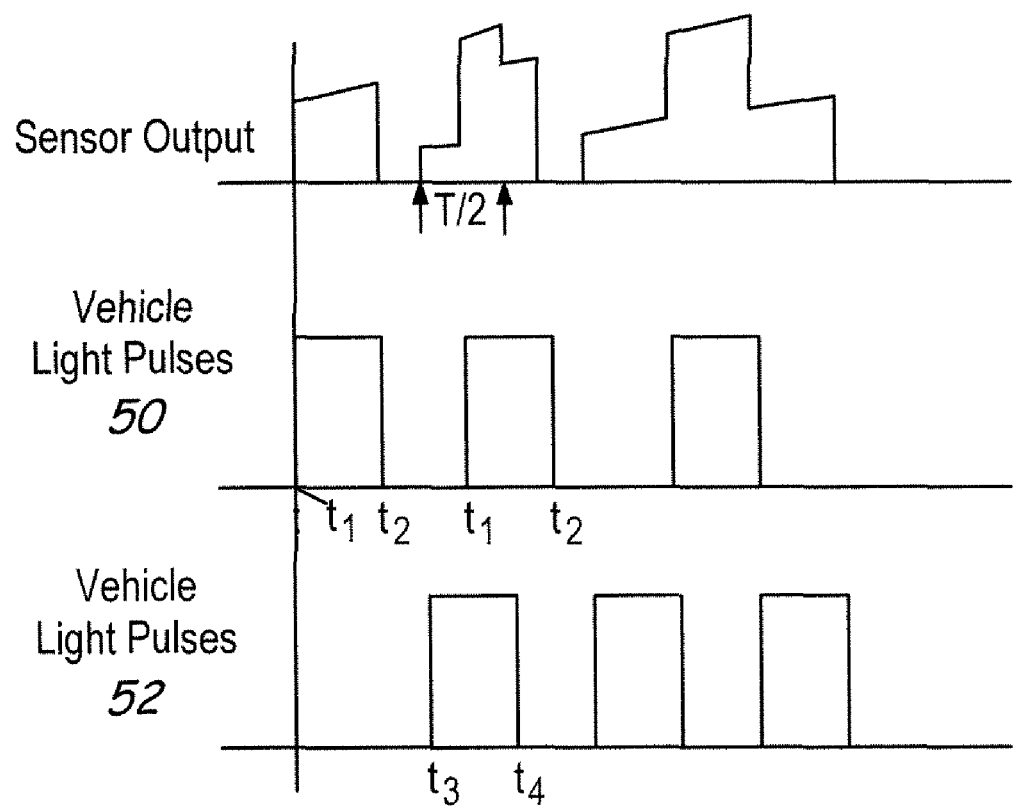
FIG. 7 shows the sensor output for another method of operating the night vision system according to the present invention.

The pulse synchronization method described with reference to FIGS. 4A, 4B and 5A, 5B could also be implemented without a trigger pulse, thus eliminating the cost and complexity of supplying the trigger pulse. In this approach, the light sensor 19 is filtered to be sensitive to the wavelength of the night vision laser pulse, rather than to that of a trigger pulse. The sensor is shielded to prevent it from seeing the direct illumination of the laser pulse, so that it sees only reflections of the pulse from nearby objects, as well as the direct laser pulse of an approaching night vision equipped vehicle. Such an approaching vehicle 52 will, in general, have its laser pulse at an arbitrary phase with respect to that of vehicle 50. The output from the light sensor 19 of vehicle 50 will therefore be of the form shown in FIG. 6. The first output pulse of the light sensor occurs before the approaching vehicle has been detected. Vehicle 50's laser pulse begins at time $t_1$ and ends at time $t_2$. For generality, the output pulses of the light sensor have been drawn to illustrate a condition where the total reflected light is increasing with time. For example, vehicle 50 may be approaching a reflective road sign. The second light sensor output pulse occurs as a night vision equipped vehicle 52 approaches. At time $t_1$ vehicle 50's pulse begins as before. At time $t_3$, the approaching vehicle 52 turns on its light-source, resulting in a sudden increase in signal from sensor 19 (left arrow). At time $t_2$, vehicle 50's pulse terminates, and at time $t_4$, vehicle 52's pulse terminates, causing a sudden decrease in signal from sensor 19 at time $t_3$. FIG. 7 shows a similar diagram for the case where vehicle 52's pulse train leads rather than lags that of vehicle 50.

The output of sensor 19 is analyzed by the vehicle night-vision controller to detect oncoming vehicle pulses. Such pulses can readily be distinguished from a change in reflection in two ways. First, the turn-on time of the approaching vehicle laser beam pulses, and thus the light sensor output rise time, is much shorter than the typical time over which reflection strength changes. Second, an approaching vehicle light source pulse is characterized by an increase in signal from sensor 19 followed by a decrease in signal exactly T/2 seconds later (assuming a 50% duty cycle). Having detected the oncoming vehicle's light source pulse, the controller of vehicle 50 times its next light source pulse to begin at the time of termination of the approaching vehicle's pulse, thus placing the two pulse trains exactly out of phase.

As in the previous case, a very rare situation could occur where both vehicles' laser beam pulses are exactly in phase. As before, the situation is so unlikely that it is probably acceptable to tolerate it. However, again there is a fix if desired. Since the approaching vehicle's laser beam will eventually become very bright (causing the blinding that this invention seeks to avoid), there could be a simple threshold discriminator. If the incoming light intensity exceeds a threshold it would signal that there is an oncoming beam, and the vehicle would adjust the phase of its pulses by a random amount as described earlier, at which point out-of-phase synchronization could occur.

Figure 8:
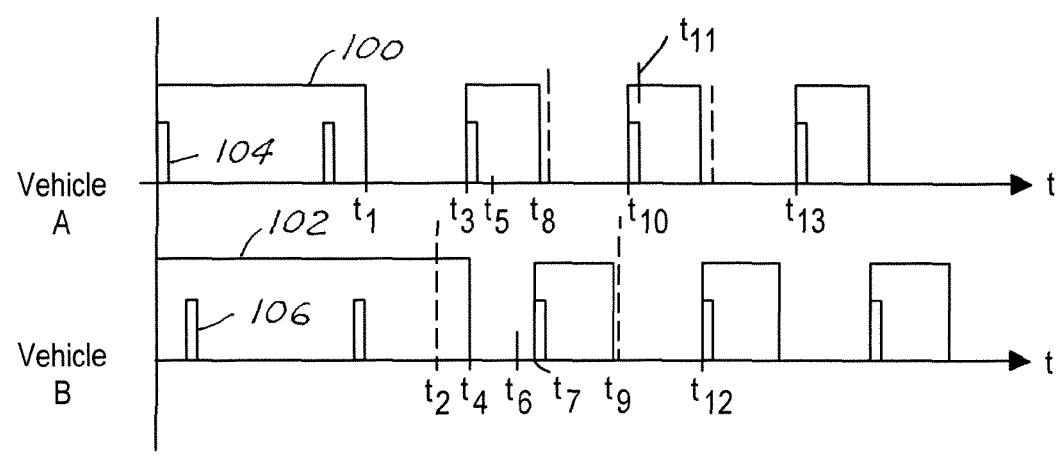
FIG. 8 is a graph showing the timing of the night vision signals for the vehicles of FIG. 2 in accordance with another embodiment of the present invention.

Referring now to FIG. 8, there is shown a timing graph of a second method of operating an active night vision system in accordance with an embodiment of the present invention. In the scheme described with reference to FIG. 8, two vehicles, vehicle A and vehicle B, are traveling in opposite directions and approaching one another such as shown in FIG. 2. In addition to the primary night vision light source, each vehicle is also equipped with a secondary light source such as low power diode laser or LED which is used as a trigger light source to synchronize the respective vehicle's primary night vision light source out-of-phase with the detected vehicle's primary night vision light source.

The trigger light source emits a short duration pulse synchronized with the main light pulse, but preferably phased so that it occurs exactly at the midpoint of the "dark" period of the main light source as before. The trigger light source also operates at a different wavelength than the primary night vision light source and, preferably, has a narrower cone angle than the primary light source. In order to be detected by an oncoming vehicle which is similarly equipped, the trigger light source emits light in the same direction as the primary night vision light source ($T_F$). In addition, the secondary light source emits light rearward of the vehicle ($T_R$) such that vehicles traveling in the same direction can synchronize their primary night vision light sources to be in-phase with one another. For example, the secondary light source can be located in a tail lamp of the night vision equipped vehicle. The forward and rearward-directed secondary light pulses can be of different pulse widths such that they can be distinguished by the vehicle traveling behind the reference vehicle or the vehicle approaching the reference vehicle as described above. Thus, upon detection of a rearward emitted trigger pulse, the vehicle following the reference vehicle would synchronize its night vision primary light source in-phase with the reference vehicle, whereas upon detection of a forward emitted trigger light pulse, the approaching vehicle would synchronize its primary night vision light source out-of-phase with the reference vehicle. Alternatively, a different wavelength of light can be used for the forward and rearward trigger light pulses rather than pulse widths.

To detect the trigger light pulses from the secondary light source, the light sensor of each vehicle's night vision system is filtered to be sensitive to the wavelength of light emitted from the secondary light source rather than the primary night vision light source.

In FIG. 8, each vehicle has its primary night vision light source on. This is shown as light pulse 100 for vehicle A and light pulse 102 for vehicle B. Each vehicle is also transmitting its secondary trigger light pulse at an arbitrary phase relationship with respect to the other vehicle. The trigger light pulses for both vehicles, however, occur at a known periodic rate. The trigger pulse for vehicle A is shown as reference 104 and the trigger pulse for vehicle B is shown as reference 106. In the example shown, the light sensor of vehicle A detects the trigger pulse of vehicle B at time $t_1$ and, in response, turns off its primary night vision light source. Because the trigger pulse period of vehicle B is known, i.e., it is the same as the trigger pulse period of vehicle A, the controller of vehicle A determines that the out-of-phase timing for vehicle B's primary night vision light source should occur at the time $t_2$. This represents the midpoint of vehicle B's trigger pulse time period. Once the out-of-phase timing point is determined, the controller of vehicle A adjusts its next primary and secondary light source pulse to occur at a time $t_3$ which is approximately halfway between time $t_2$ and when the trigger pulse of vehicle A would have otherwise occurred at time $t_5$.

The trigger pulse of vehicle A at time $t_3$ is sensed by the light sensor of vehicle B and in response, the primary night vision light source of vehicle B is turned off at time $t_4$. Accordingly, the controller of vehicle B determines the out-of-phase timing of the trigger pulse sequence of vehicle A to occur at time $t_8$. The controller of vehicle B therefore adjusts its primary and secondary light source pulses to occur at a time $t_7$ which is halfway between time $t_8$ and the time $t_6$ when the trigger pulse of vehicle B would have otherwise occurred.

The sequence then repeats. Specifically, the trigger pulse of vehicle B at time $t_7$ is again detected by the light sensor of vehicle A, and the controller of vehicle A further refines the trigger pulse timing of vehicle A's night vision system to be out-of-phase with that of vehicle B. Thus, vehicle A determines the next trigger pulse of vehicle B to occur at a time $t_9$ and adjusts its trigger pulse to occur at a time $t_{10}$ which is halfway between $t_9$ and when vehicle A's trigger pulse would have otherwise occurred at $t_{11}$. In response to the trigger pulse of vehicle A occurring at $t_{10}$, the controller of vehicle B makes a similar adjustment, resulting in its trigger pulse occurring at time $t_{12}$. By the time $t_{13}$, the primary night vision light source of both vehicles are out-of-phase with each other.

In either the example of FIG. 3 or FIG. 8, if a night vision equipped vehicle were approaching another similarly equipped night vision vehicle traveling in the same direction, the lead car's trigger pulse is recognized as a rearwardly directed trigger pulse ($T_R$) by its distinctive pulse width or wavelength, or other identifying characteristic. The following vehicle, in response, immediately adjusts its primary night vision light source and secondary light source trigger pulses to be in-phase with those of the lead car. In this way, an oncoming night vision equipped vehicle approaching the two synchronized vehicles traveling in the same direction would "see" the two approaching vehicles as one synchronized primary and secondary light source pulse train. In addition, the lead vehicle such as vehicle 52 of FIG. 2, upon detecting vehicle 50 traveling in the opposite direction, changes its rearwardly directed trigger pulse (from $T_{R1}$ to $T_{R2}$) width or wavelength or other identifying characteristic to indicate to the controller of the following vehicle 51 that vehicle 52 had locked onto an approaching night vision equipped vehicle 50. This indicates to the controller of vehicle 51 to switch its primary night vision vehicle light source to pulse mode in sync with the lead vehicle 52 night vision system.

An approaching night-vision-equipped vehicle traveling in the same direction need not immediately switch its primary light source to pulsed operation upon the detection of a leading vehicle's rear trigger pulse. Rather, it would continue emitting in a continuous mode operation until the leading vehicle detected an oncoming night-vision-equipped vehicle. At this point, the leading vehicle would switch its rearward trigger light pulse ($T_{R1}$) to indicate a detected oncoming vehicle ($T_{R2}$). Upon detection of the $T_{R2}$ pulse, the following vehicle switches to pulsed primary light source operation in-phase with the leading vehicle, and would continue in this mode until the lead vehicle changes to $T_{R1}$ and the following car does not detect any forward trigger pulse ($T_F$) from the approaching vehicle.

In another embodiment, the front trigger laser of each vehicle can be eliminated such that only the rearwardly directed trigger laser is used to synchronize the respective vehicle's night vision system light source. In this scheme, all vehicles traveling in the same direction synchronize their pulsed primary night vision light sources as described above. Two vehicles approaching each other from opposite directions detect the other vehicle's primary night vision light source and adjust accordingly to move out of phase with each other. This can be accomplished by integrating the amount of light detected in two equal length time windows representing the first half and second half of the "dark period" between light source pulses. When the intensity levels of the detected light in the two time windows are approximately equal, it is an indication that the opposing vehicle's primary light source is "on" when the reference vehicle's primary light source is off. In this way, all vehicles can appropriately operate their respective primary light source in a pulse mode to avoid blinding without the need for a forward trigger light pulse.

Figure 9:
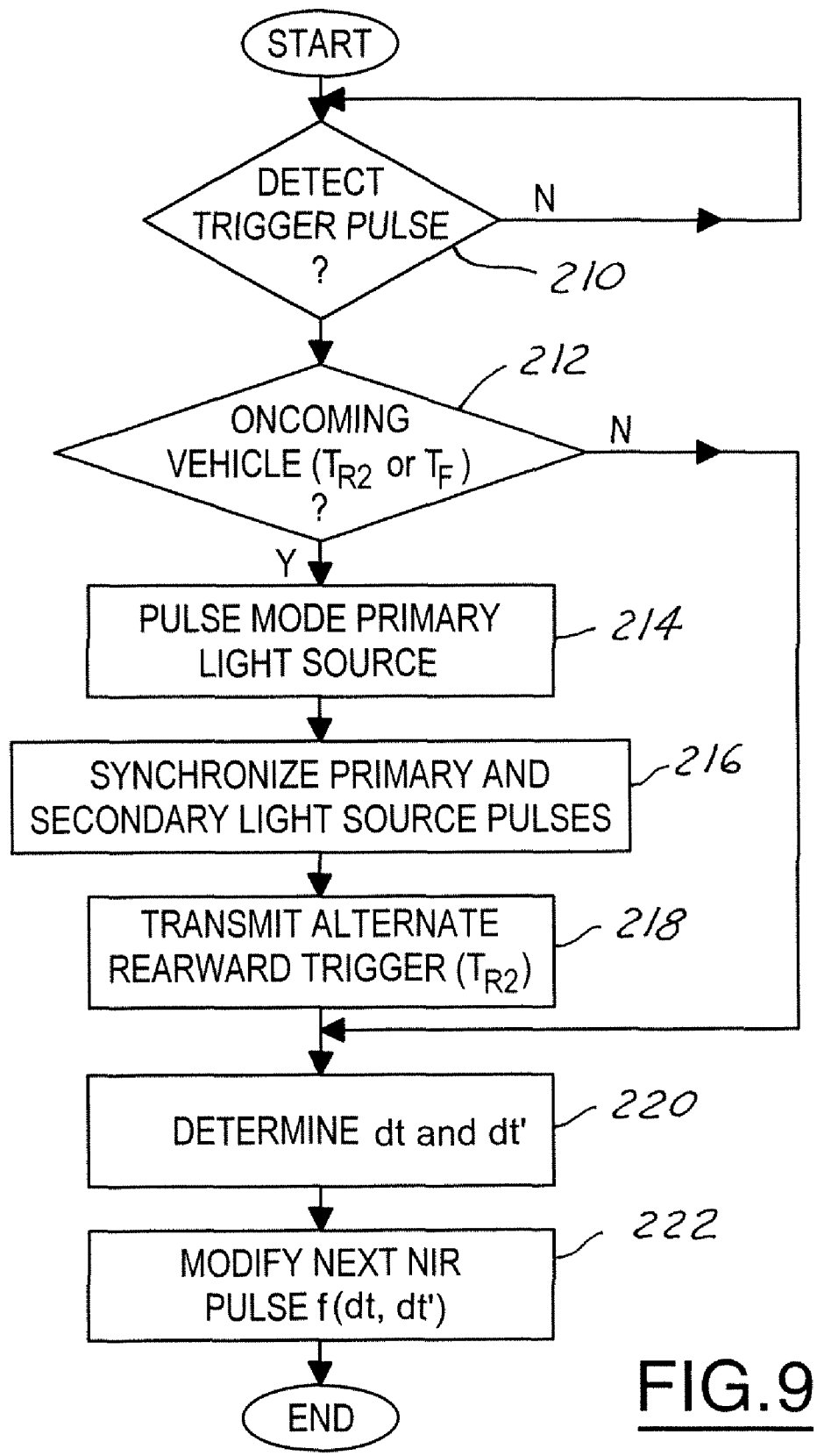
FIG. 9 is a logic flow diagram of one method of operating the night vision system according to the present invention.

Referring now to FIG. 9 there is shown a logic flow diagram of a method of operating a night vision system in accordance with the anti-blinding scheme of FIG. 3. The logic begins in block 210 when a trigger pulse of another vehicle is detected by the light sensor of the night vision system of the reference vehicle. In block 212, the characteristic of the trigger pulse is examined to determine whether it was a rearwardly projected trigger pulse ($T_R$) from a vehicle in front of the reference vehicle traveling in the same direction, or a forward transmitted trigger pulse ($T_F$) from an oncoming vehicle traveling in the opposite direction. For a detected oncoming vehicle, the logic continues to block 214 and the primary light source of the reference vehicle is immediately turned off and, thereafter, operated in pulse mode at a duty cycle of approximately 50% or less. In block 216, the primary and secondary light source pulses are synchronized such that the secondary light source trigger occurs at the midpoint of the primary light source "dark" period. To alert vehicles rearward of the reference vehicle, the alternate rearward trigger pulse is transmitted in block 218. The alternate rearward trigger pulse ($T_{R2}$) has characteristics, i.e., wavelength or duration, different than the normal rearward trigger pulse. This alerts vehicles following the reference vehicle that a lead vehicle has detected an oncoming vehicle traveling in the opposite direction and that it is necessary to operate the night vision system in a synchronized pulse mode. In block 220, the values for dt and dt' are determined and compared. Based on the relative difference between dt and dt' (based on magnitude or ratio), the reference vehicle's NIR pulse is modified in block 222. This can be accomplished by advancing or delaying the NIR pulse by a fixed amount or as a function of the ratio of dt to dt'. This continues until dt and dt' are approximately equal. When the pulse phase timing is known, as in the case of similarly equipped NVE vehicles, the out of phase synchronization can occur in as little as one pulse phase. This results when the first vehicle detects the oncoming vehicle's trigger pulse. At such time, the detecting vehicle can advance or delay its trigger pulse to occur at T/2 after the detected vehicle's trigger pulse. In other words, the detecting vehicle's primary light source can be pulsed, in response to the detected trigger pulse, to be centered around a time T after detecting the oncoming vehicle trigger pulse. Thus, the vehicles will be synchronized out of phase immediately upon the detection of either vehicle's oncoming trigger pulse.

For vehicles traveling in the same direction where no oncoming vehicle is detected (normal rearward trigger pulse only), the vehicles can synchronize their respective secondary light source trigger pulses and maintain their primary night vision light source on for any duty cycle up to 100%. Where an oncoming vehicle's trigger pulse is detected, or an alternate rearward trigger pulse ($T_{R2}$) is detected, the reference vehicle's primary night vision light source will be operated in pulse mode at a duty cycle of less than approximately 50%. In block 222, the reference vehicle's trigger pulse will be modified to be either in-phase with the lead vehicle's trigger pulse in the case of a detected rearward trigger ($T_{R1}$ or $T_{R2}$), or out-of-phase with a detected trigger pulse from an oncoming vehicle ($T_F$).

Figure 10:
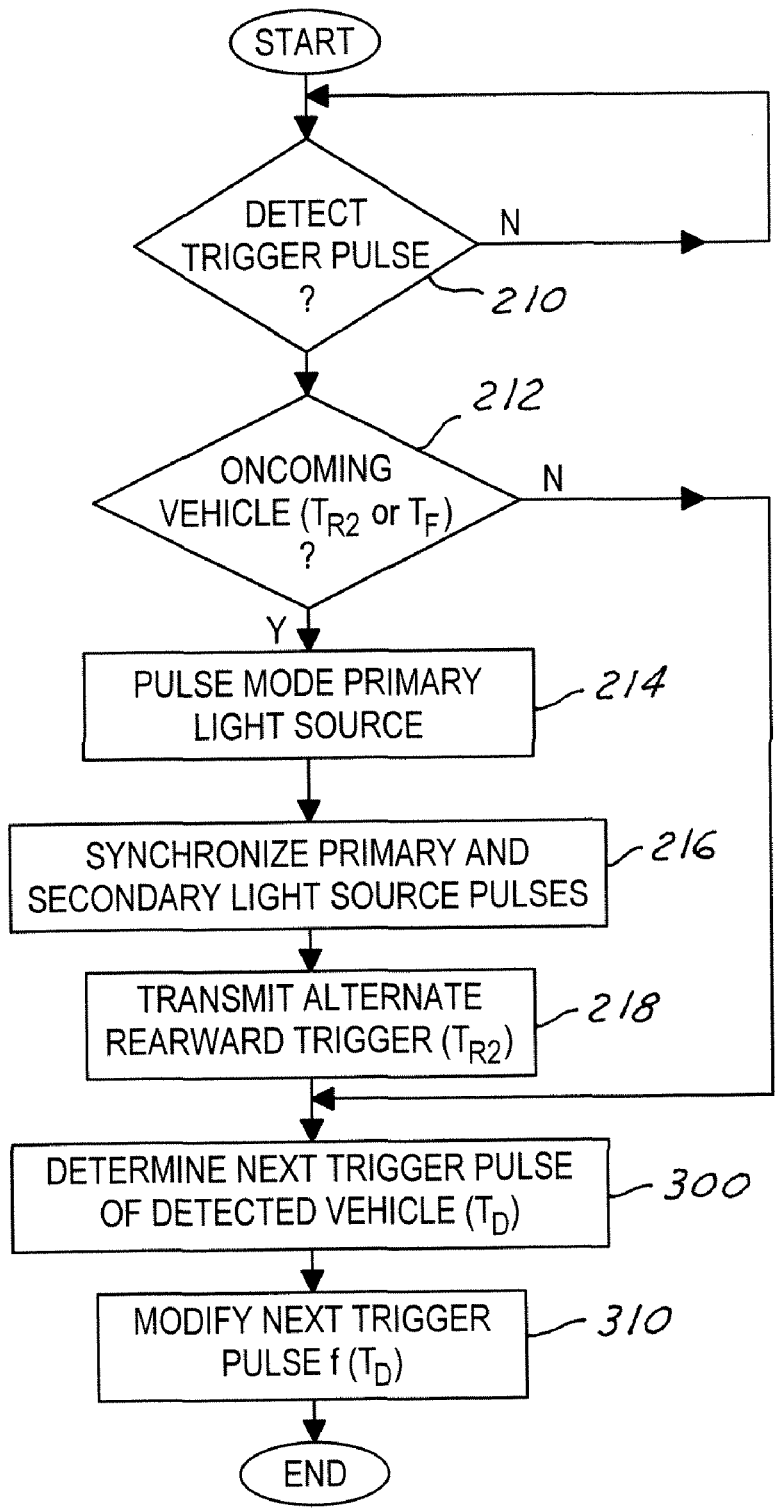
FIG. 10 is a logic flow diagram of another method of operating the night vision system according to the present invention.

Referring now to FIG. 10, there is shown a logic flow diagram of another method of operating an active night vision system in accordance with the present invention corresponding to the anti-blinding scheme of FIG. 8. The logic is the same as that described with respect to FIG. 9 for blocks 210 through 218 regarding the detection of an oncoming vehicle trigger pulse and the transmission of an alternate rearward trigger in the presence of a detected forward trigger pulse. In block 216, however, the primary and secondary light source pulses of the reference vehicle are synchronized such that the primary light source pulse begins at the same time as the secondary light source trigger pulse. In block 300, the next trigger pulse of the detected vehicle is determined since the trigger frequency of all night-vision-equipped vehicles is know. Based on the predicted timing of the detected vehicle's next trigger pulse, the reference vehicle's trigger pulse is modified in block 310. This is accomplished by modifying the synchronized NIR pulse and trigger pulse to start at a time half way between their original time period and a time corresponding to be exactly out-of-phase with that of the detected oncoming vehicle.

From the foregoing, it can be seen that there has been brought to the art a new and improved vehicle active night vision system which has advantages over prior vehicle night vision systems. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A night vision system for a vehicle comprising:
  a first light source for illuminating a region proximate the vehicle, said light source operating at a first wavelength;
  a pulsed second light source for illuminating a region forward of the vehicle, said second light source operating at a second wavelength and a first time period (T);
  a light sensor for generating a timing signal in response to detecting light at approximately said second wavelength; and
  a controller programmed to pulse said first light source between pulses of said second light source in response to said timing signal, and modify said first time period such that the next second light source pulse occurs at T/2 after said timing signal.

2. A night vision system according to claim 1 wherein said controller is programmed to pulse said first light source at a duty cycle less than 50% in response to said timing signal.

3. A night vision system according to claim 2 wherein said second light source pulse is advanced to occur at T/2 after said timing signal.

4. A night vision system according to claim 2 wherein said second light source pulse is delayed to occur at T/2 after said timing signal.

5. A night vision system according to claim 1 wherein said second light source also illuminates a region rearward of the vehicle.

6. A night vision system according to claim 5 wherein the light pulses of said second light source in the forward direction differ from the light pulses of said second light source in the rearward direction.

7. A night vision system for a vehicle comprising:
  a first light source for illuminating a region proximate the vehicle, said light source operating at a first wavelength;
  a pulsed second light source for illuminating a region forward of the vehicle, said second light source operating at a second wavelength and a first time period (T);
  a light sensor for generating a timing signal in response to detecting light at approximately said second wavelength, said timing signal being indicative of another vehicle's second light source; and
  a controller programmed to pulse said first light source in response to said timing signal such that said pulse is centered around a time delay of T seconds after said timing signal.

8. A night vision system according to claim 7 wherein said controller is programmed to pulse said first light source at a duty cycle less than approximately 50% in response to said timing signal.

9. A night vision system according to claim 7 comprising a gated receiver for receiving light reflected off objects illuminated in said region by said first light source and generating a signal responsive to said received light.

10. A night vision system according to claim 7 wherein said controller is programmed to turn off first light source in response to said timing signal, modify said first time period of second light source, and synchronize said first and second light sources such that said first light source is off for a period of time relating to the periodic detection of the second wavelength of light.

11. A night vision system according to claim 7 wherein said first and second light sources are laser diodes, and said second light source is pulsed at a duty cycle less than 50%.

12. A night vision system according to claim 11 wherein said light sensor is a photocell or photodiode.

13. A night vision system according to claim 7 wherein said second light source also illuminates a region rearward of said vehicle.

14. A night vision system according to claim 7 comprising a pulsed third light source for illuminating a region rearward of the vehicle, said third light source operating at a third wavelength and said first time period.

15. A night vision system according to claim 9 comprising a display for imaging said receiver signal.

16. A method for an active night vision system for a vehicle comprising:
  activating a first light source to illuminate a region proximate the vehicle, said light source operating at a first wavelength;
  pulse activating a second light source to illuminate a region forward of the vehicle, said second light source operating at a second wavelength and a first time period (T);
  generating a timing signal in response to detecting light at approximately said second wavelength, said timing signal indicative of another vehicle's second light source; and
  pulse activating said first light source in response to said timing signal at a duty cycle less than 50%, said first light source pulses at a delay of T seconds after said timing signal.

17. A method according to claim 16 comprising advancing or delaying said second light source pulse to occur at a time T/2 seconds after said timing signal.

18. A method according to claim 16 comprising pulse activating said second light source to illuminate a region rearward of the vehicle.

19. A method according to claim 16 comprising generating an image signal in response to light reflected off objects illuminated in said region by said first light source.

20. A method according to claim 19 comprising displaying said image signal on a display within said vehicle.

* * * * *